United States Patent
Yamauchi et al.

(10) Patent No.: US 8,333,849 B2
(45) Date of Patent: Dec. 18, 2012

(54) LOW-CARBON MARTENSITIC CHROMIUM-CONTAINING STEEL

(75) Inventors: Katsuhisa Yamauchi, Chiba (JP); Yasushi Kato, Chiba (JP); Takumi Ujiro, Chiba (JP); Takako Yamashita, Chiba (JP)

(73) Assignee: JFE Steel Corporation (JP)

( * ) Notice: Subject to any disclaimer, the term of this patent is extended or adjusted under 35 U.S.C. 154(b) by 134 days.

(21) Appl. No.: 12/989,084

(22) PCT Filed: Apr. 23, 2009

(86) PCT No.: PCT/JP2009/058536
§ 371 (c)(1),
(2), (4) Date: Oct. 22, 2010

(87) PCT Pub. No.: WO2009/131248
PCT Pub. Date: Oct. 29, 2009

(65) Prior Publication Data
US 2011/0030851 A1    Feb. 10, 2011

(30) Foreign Application Priority Data
Apr. 25, 2008    (JP) .................. 2008-115010

(51) Int. Cl.
*C22C 38/48*    (2006.01)
*C22C 38/46*    (2006.01)

(52) U.S. Cl. ........................... 148/325; 148/326
(58) Field of Classification Search ............ 148/326, 148/506, 325; 420/69, 70
See application file for complete search history.

(56) References Cited

FOREIGN PATENT DOCUMENTS

| EP | 1 621 644 A1 | 2/2006 |
|---|---|---|
| EP | 2 011 891 A1 | 1/2009 |
| JP | 2001-220654 A | 8/2001 |
| JP | 2004-346425 A | 12/2004 |
| JP | 2005-307346 A | 11/2005 |
| JP | 2006-322071 A | 11/2006 |
| JP | 2007-070654 A | 3/2007 |
| JP | 2007-321245 A | 12/2007 |

*Primary Examiner* — Deborah Yee
(74) *Attorney, Agent, or Firm* — DLA Piper LLP (US)

(57) ABSTRACT

A material for brake discs has temper softening resistance sufficient to maintain a hardness of HRC 31 or more after tempering at 700° C. for one hour. The low-carbon martensitic chromium-containing steel contains 0.02% to 0.10% of carbon and 0.02% to 0.10% of nitrogen, the total content of carbon and nitrogen being 0.08% to 0.16%; 0.5% or less of silicon; 0.1% or less of aluminum; 0.3% to 3.0% of manganese; 10.5% to 13.5% of chromium; 0.05% to 0.60% of niobium and 0.15% to 0.80% of vanadium, the total content of niobium and vanadium being 0.25% to 0.95%; 0.02% to 2.0% of nickel; and 1.5% or less of copper, and has an Fp value (=−230C+5Si−5Mn−6Cu+10Cr−12Ni+32Nb+22V+12Mo+8W+10Ta+40Al−220N) of 80.0 to 96.0, a hardness after quenching of HRC 31 to 40, and a hardness after tempering at 700° C. for one hour of HRC 31 or more.

10 Claims, 5 Drawing Sheets

LOW-CARBON MARTENSITIC CHROMIUM-CONTAINING STEEL

RELATED APPLICATIONS

This is a §371 of International Application No. PCT/JP2009/058536, with an international filing date of Apr. 23, 2009 (WO 2009/131248 A1, published Oct. 29, 2009), which is based on Japanese Patent Application No. 2008-115010, filed Apr. 25, 2008, the subject matter of which is incorporated by reference.

TECHNICAL FIELD

This disclosure relates to low-carbon martensitic chromium-containing steels used for discs of disc brakes for two-wheeled vehicles such as motorcycles and bicycles, and having superior corrosion resistance, appropriate quenching hardness, and superior temper softening resistance to heat generated during braking

BACKGROUND

Discs of disc brakes for two-wheeled vehicles such as motorcycles and bicycles (slide sections for brake pads) can be repeatedly heated to about 500° C. during braking by friction heat with brake pads. Accordingly, materials used for brake discs require heat resistance (temper softening resistance) sufficient not to be softened by heat generated during braking An excessively hard brake disc, on the other hand, squeals during braking and considerably wears a brake pad. There is therefore an appropriate range of hardness for brake discs, typically from about 31 to 38 in HRC (Rockwell Hardness C-scale). The hardness, however, can be permitted to a level exceeding HRC 40 because the upper limit thereof varies with the type of brake pad and the combination of the brake pad and the disc.

Brake discs also require superior corrosion resistance (rusting resistance) for esthetic considerations and concern about an adverse effect on brake performance. Accordingly, low-carbon martensitic stainless steels containing 12% to 13% by mass of chromium have been frequently used as materials for brake discs because they not only have the corrosion resistance required for brake discs, but also have appropriate hardness in an as-quenched state and maintain substantially appropriate hardness when tempered at 500° C. for about one hour.

However, still superior heat resistance has been demanded for brake discs and materials therefor in view of improving brake performance such as braking capacity, reducing weight, and diversifying design. To meet that demand, various highly heat-resistant steels have been proposed. For example, Japanese Unexamined Patent Application Publication Nos. 2001-220654 and 2007-070654 disclose steels, with superior temper softening resistance, produced by adding, or increasing the amounts of, elements that improve temper softening resistance such as carbon, copper, niobium, vanadium, and molybdenum so that it maintains a hardness of HRC 30 or more not only after quenching, but also after tempering at 550° C. to 650° C. for about one hour.

In addition, Japanese Unexamined Patent Application Publication No. 2005-307346 discloses a steel produced by adding appropriate amounts of niobium, nickel, and vanadium and increasing the nitrogen content to relatively reduce the carbon content so that it has superior corrosion resistance, has an appropriate quenching hardness, namely, HRC 32 to 38, and maintains a high hardness, namely, HRC 32 or more, after tempering at 600° C. for two hours.

In general, brake discs are rarely heated to a temperature range of 650° C. to 700° C. during braking of, for example, a motorcycle or a bicycle. Nevertheless, a material for brake discs that has heat resistance in such a temperature range provides advantages including improved brake performance, a weight reduction due to reduced thickness, and greater design flexibility. These advantages are particularly beneficial for brake discs of large- and medium-sized motorcycles, especially sport-style motorcycles, and accordingly an increase in the heat resistance of the materials therefor has been highly expected.

Accordingly, it could be helpful to provide a material for brake discs that has a higher heat resistance (temper softening resistance) than conventionally used or proposed materials. It could also be helpful to provide a material for brake discs that has a hardness after quenching of HRC 31 to 40 and temper softening resistance sufficient to maintain an appropriate hardness, namely, HRC 31 to 38, after tempering at 700° C. for one hour.

SUMMARY

We provide a low-carbon martensitic chromium-containing steel containing 0.02% to 0.10% by mass of carbon and 0.02% to 0.10% by mass of nitrogen, the total content of carbon and nitrogen being 0.08% to 0.16% by mass; 0.5% by mass or less of silicon; 0.1% by mass or less of aluminum; 0.3% to 3.0% by mass of manganese; 10.5% to 13.5% by mass of chromium; 0.05% to 0.60% by mass of niobium and 0.15% to 0.80% by mass of vanadium, the total content of niobium and vanadium being 0.25% to 0.95% by mass; 0.02% to 2.0% by mass of nickel; and 1.5% by mass or less of copper, the balance including iron and incidental impurities, and the steel has an Fp value of 80.0 to 96.0, a hardness after quenching of HRC 31 to 40, and a hardness after tempering at 700° C. for one hour of HRC 31 or more. The Fp value is represented by equation (1):

$$Fp\ \text{value} = -230C + 5Si - 5Mn - 6Cu + 10Cr - 12Ni + 32Nb + 22V + 12Mo + 8W + 10Ta + 40Al - 220N \quad (1)$$

wherein the element symbols denote the contents of the respective elements (% by mass).

The low-carbon martensitic chromium-containing steel is characterized by containing one or more elements selected from molybdenum, tungsten, and tantalum in a total amount of 0.1% to 2.0% by mass in addition to the above ingredient composition.

In addition, the low-carbon martensitic chromium-containing steel is characterized by containing one or more elements selected from 0.0002% to 0.0030% by mass of calcium, 0.0002% to 0.0030% by mass of magnesium, and 0.0002% to 0.0060% by mass of boron in addition to the above ingredient composition.

In addition, the low-carbon martensitic chromium-containing steel is a low-carbon martensitic chromium-containing steel having a structure containing 5% by volume or less of delta-ferrite phase after quenching.

In addition, we provide a brake disc characterized by being formed of the above low-carbon martensitic chromium-containing steel.

A low-carbon martensitic chromium-containing steel capable of maintaining a hardness of HRC 31 or more when tempered at a temperature of 700° C. is provided. Accordingly, if the steel is used for brake discs of, for example, a motorcycle or a bicycle, it allows for improved brake performance, a weight reduction due to reduced thickness, and greater design flexibility.

DETAILED DESCRIPTION

Figure 1:
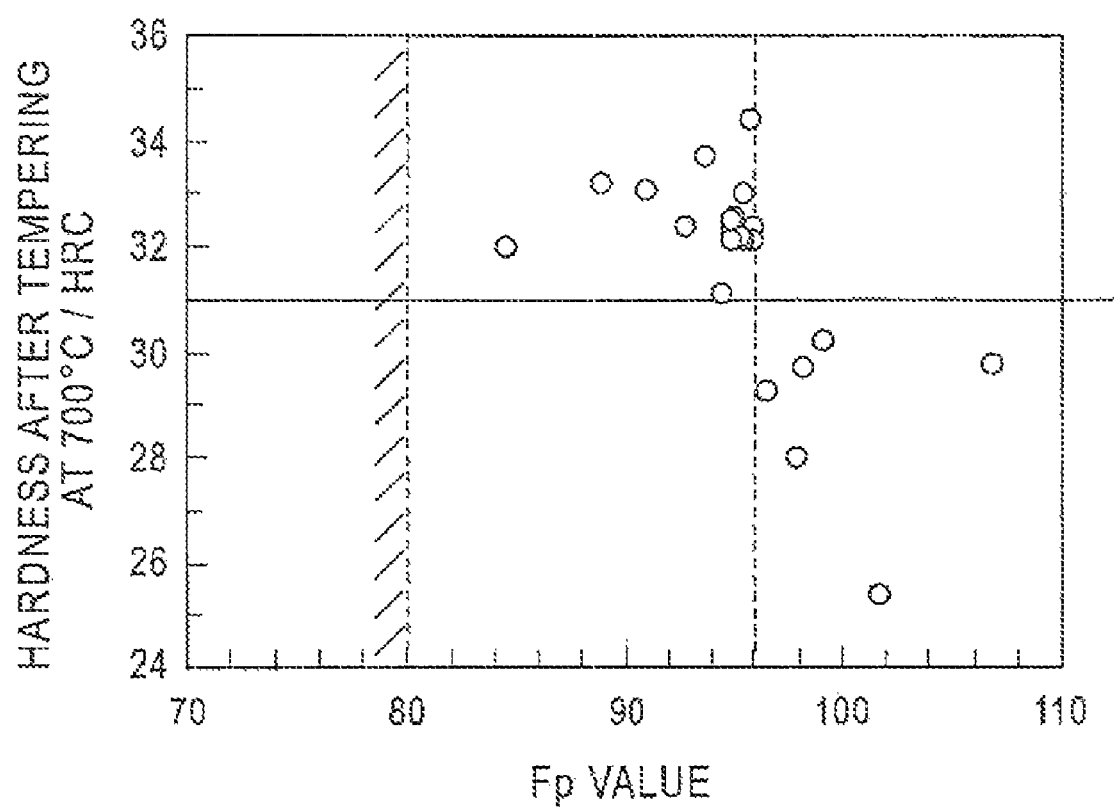
FIG. 1 is a graph showing the relationship between the Fp values and the hardnesses after tempering at 700° C. of our examples and comparative examples.

We studied in detail the effects of various ingredients on the heat resistance of chromium-containing steels. As a result, we found that a chromium-containing steel produced by simultaneously adding appropriate amounts of carbon, nitrogen, niobium, and vanadium while adjusting the amounts of elements added so as to reduce the amount of delta-ferrite phase generated at heat soaking during quenching treatment and remaining after quenching, which has not been appropriately controlled in the conventional art, has sufficient heat resistance to tempering at a temperature of 700° C. due to the solid solution effect and the precipitation effect of these elements. In addition, we found that sufficient heat resistance can be more stably ensured by adding appropriate amounts of molybdenum, tungsten, and tantalum and that corrosion resistance and manufacturability (hot workability) can be improved by adding appropriate amounts of calcium, magnesium, and boron. The term "delta-ferrite" refers to a ferrite phase formed after quenching.

The term "ferrite" hereinafter means delta-ferrite unless otherwise specified.

A low-carbon martensitic chromium-containing steel characterized in that it has corrosion resistance (rusting resistance) sufficient for brake discs, has a hardness of HRC 31 to 40, preferably HRC 33 to 38, in an as-quenched state, and has heat resistance (temper softening resistance) sufficient to maintain a hardness of HRC 31 or more after tempering at 700° C. for one hour. The term "as-quenched state" encompasses a state subjected to mild stress release annealing or tempering after quenching depending on purposes.

The ingredient composition of the low-carbon martensitic chromium-containing steel will be described below.

Carbon: 0.02% to 0.10% by mass; nitrogen: 0.02% to 0.10% by mass; and carbon+nitrogen: 0.08% to 0.16% by mass Carbon and nitrogen are important elements that dissolve in the steel or that precipitate by forming carbide, nitride, or carbonitride with other element such as niobium or vanadium to provide the effect of improving hardness after quenching or tempering. To ensure a predetermined hardness after quenching or tempering, carbon and nitrogen must each be contained in an amount of 0.02% by mass or more and, at the same time, must be contained in a total amount of 0.08% by mass or more. However, adding carbon excessively in an amount exceeding 0.10% by mass increases coarse precipitates and thereby decreases the effect of inhibiting temper softening, and also decreases corrosion resistance and toughness. Similarly, adding nitrogen excessively in an amount exceeding 0.10% by mass significantly decreases hot ductility and contributes to a scab or a crack during casting or hot rolling, thus making manufacture difficult. Accordingly, the upper limits of the carbon and nitrogen contents are each 0.10% by mass.

In addition, a total content of carbon and nitrogen exceeding 0.16% by mass decreases manufacturability, punching workability, and heat resistance. Accordingly, the carbon and nitrogen contents are each 0.02% to 0.10% by mass, and the total content thereof is 0.08% to 0.16% by mass. In view of stably ensuring sufficient heat resistance, the carbon content is preferably 0.03% by mass or more, the nitrogen content is preferably 0.04% by mass or more, and the total content thereof is preferably 0.10% by mass or more. It is preferable that the hardness after tempering at 700° C. be higher within an appropriate range, namely, HRC 31 or more, and a hardness of HRC 32 or more can be stably ensured by adding nitrogen in an amount of 0.04% by mass or more.

Silicon: 0.5% by mass or less

Silicon is an element added as a deoxidizing agent and is preferably added in an amount of 0.05% by mass or more together with manganese to achieve the effect thereof. However, adding silicon excessively in an amount exceeding 0.5% by mass promotes formation of ferrite phase during quenching, thus decreasing hardness. Accordingly, the silicon content is 0.5% by mass or less.

Aluminum: 0.1% by mass or less

Aluminum is an element added as a deoxidizing agent, although the deoxidizing effect thereof is saturated if it is added in an amount exceeding 0.04% by mass. In addition, excessively adding aluminum increases surface defects due to aluminum-containing inclusions and decreases punching workability. In particular, the upper limit of the aluminum content is 0.1% by mass because, if it exceeds 0.1% by mass, the adverse effect thereof appears significantly. Preferably, the aluminum content is 0.04% by mass or less. In addition, as in the case of silicon, aluminum decreases hardness because it promotes formation of ferrite phase during quenching. Accordingly, the aluminum is preferably 0.02% by mass or less if silicon is added in an amount of 0.1% by mass or more.

Manganese: 0.3% to 3.0% by mass

Manganese is an element that has a deoxidizing effect and that is useful for inhibiting formation of ferrite phase during quenching to stably ensure appropriate hardness after quenching, and must be added in an amount of 0.3% by mass or more to achieve the effect thereof. The manganese content, however, is 3.0% by mass or less because excessively adding manganese significantly decreases punching workability and corrosion resistance. The manganese content is preferably 0.5% by mass or more in view of stably ensuring sufficient hardenability and is preferably 2.5% by mass or less in view of improving punching workability and corrosion resistance.

Chromium: 10.5% to 13.5% by mass

Chromium is an element essential for improving corrosion resistance in our steels and must be added in an amount of 10.5% by mass or more to achieve the corrosion resistance demanded for materials of discs. Adding chromium in an amount exceeding 13.5% by mass, however, decreases punching workability and toughness and also makes it difficult to ensure appropriate quenching hardness because a sufficient amount of martensitic phase is not formed after quenching. Accordingly, the chromium content is 10.5% to 13.5% by mass. The chromium content is preferably 11.0% by mass or more in view of rusting resistance and is preferably 13.0% by mass or less in view of punching workability and heat resistance.

Niobium: 0.05% to 0.60% by mass; vanadium: 0.15% to 0.80% by mass; and niobium+vanadium: 0.25% to 0.95% by mass Niobium and vanadium are elements having a great effect of inhibiting temper softening by dissolving in the steel or forming carbonitride with carbon and nitrogen and are necessary to ensure the intended heat resistance, namely, a hardness of HRC 31 or more after tempering at 700° C. for one hour. It is important to simultaneously add niobium and vanadium to achieve the effect thereof Specifically, the niobium content must be 0.05% by mass or more, the vanadium content must be 0.15% by mass or more, and the total content thereof must be 0.25% by mass or more. On the other hand, the niobium and vanadium contents are 0.60% by mass or less and 0.80% by mass or less, respectively, and the total content thereof is 0.95% by mass or less because excessively adding niobium and vanadium decreases hardness after quenching or tempering as a result of formation of ferrite phase during quenching. Accordingly, the niobium content is 0.05% to 0.60% by mass, the vanadium content is 0.15% to 0.80% by mass, and the total content of niobium and vanadium is 0.25% to 0.95% by mass. In view of stably ensuring sufficient heat resistance, the niobium content is preferably 0.10% by mass or more, and the total content of niobium and vanadium is preferably 0.35% by mass or more. In view of manufacturability, additionally, the total content of niobium and vanadium is preferably 0.80% by mass or less because excessively adding niobium or vanadium tends to cause defects due to decreased hot workability.

Nickel: 0.02% to 2.0% by mass

Nickel is an element that inhibits formation of ferrite phase during quenching for improved hardenability and also improves corrosion resistance. To achieve these effects, nickel must be added in an amount of 0.02% by mass or more. On the other hand, the upper limit is 2.0% by mass because excessively adding nickel increases the hardness before quenching and therefore decreases punching workability and also because the hardness after quenching can exceed a predetermined range. In particular, the nickel content is preferably 1.5% by mass or less to achieve a hardness before quenching of HRB 95 or less in view of ensuring sufficient punching workability. More preferably, the nickel content is 0.1% to 1.4% by mass.

Copper: 1.5% by mass or less

Copper is an element that improves corrosion resistance and that has the effect of inhibiting temper softening by precipitating at a temperature of 500° C. to 600° C. during tempering.

Figure 4:
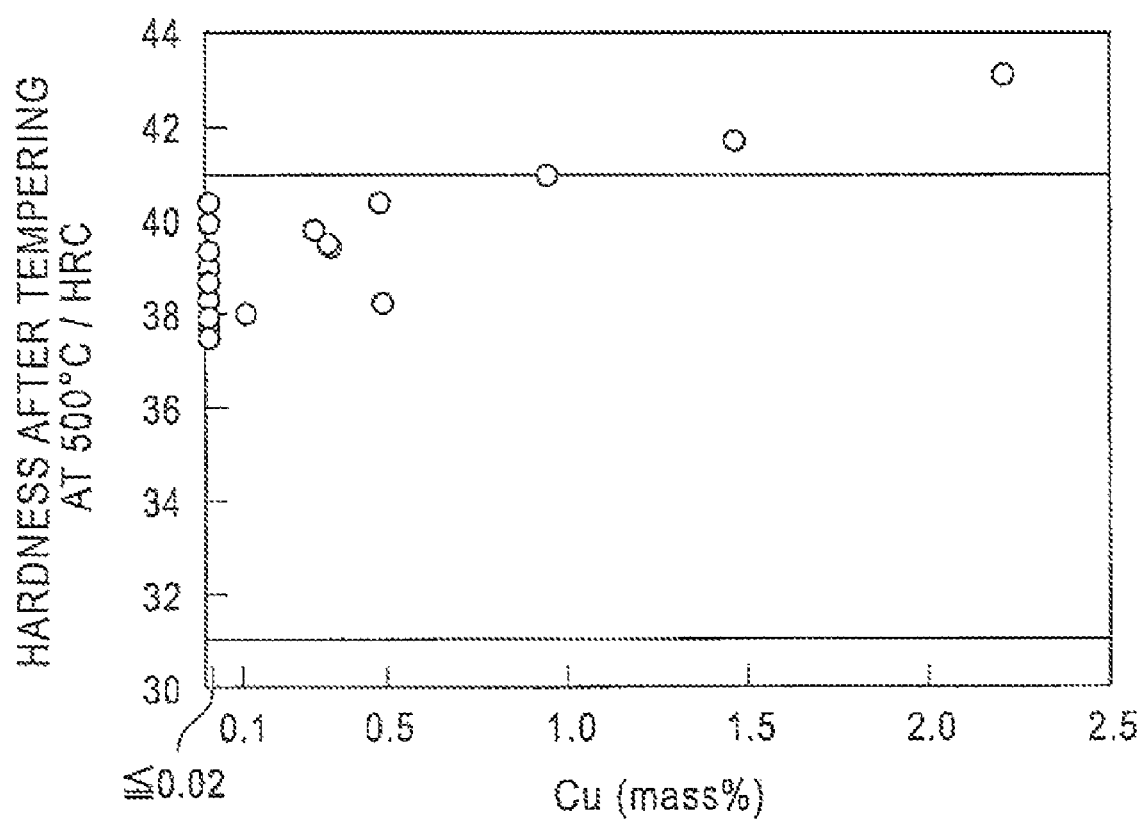
FIG. 4 is a graph showing the relationship between the amounts of copper addition and the hardnesses after tempering at 500° C. of our examples and a comparative example with respect to copper content (2.21% by mass).
Figure 5:
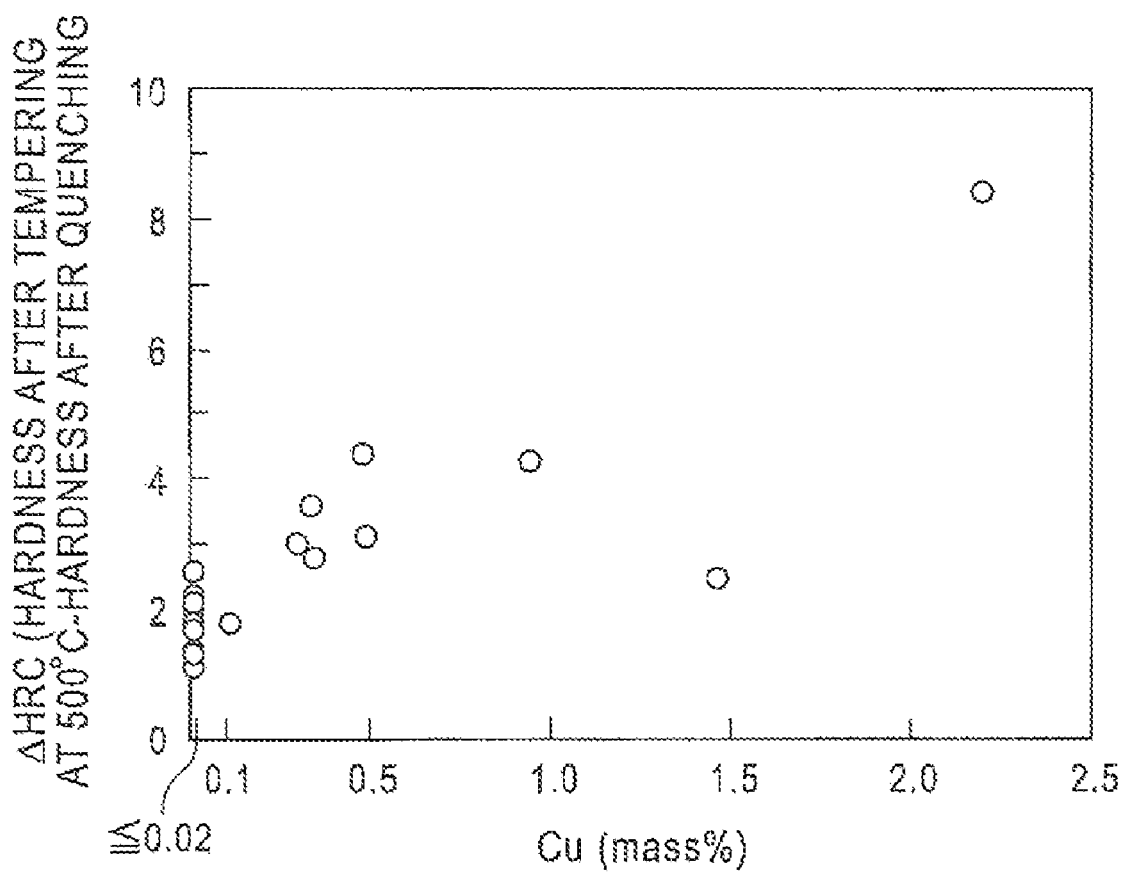
FIG. 5 is a graph showing the relationship between the amounts of copper addition and the increases in hardness after tempering (differences between the hardnesses after tempering at 500° C. and the hardnesses after quenching) of our examples and the comparative example with respect to copper content (2.21% by mass).

FIGS. 4 and 5 are graphs obtained by plotting our examples and a comparative example with respect to copper content (2.21% by mass) in our Examples (Tables 1-1, 1-2, 1-3, and 1-4), as described later, showing the relationship between the amount of copper addition and the hardness after tempering at 500° C. and the relationship between the amount of copper addition and the increase in hardness after tempering (difference between the hardness after tempering at 500° C. and the hardness after quenching), respectively. These graphs show that the addition of copper increases surface hardness after tempering at 500° C., indicating that it inhibits softening. To achieve the above effect, therefore, copper is preferably intentionally added.

However, excessively adding copper together with niobium and vanadium causes a brake squeal and pad wear because the hardness considerably exceeds the appropriate range as a result of precipitation during tempering. Although a slight excess of hardness may be tolerated by, for example, the type of the brake structure and pad selected, a level exceeding HRC 42 is beyond the allowable range. Accordingly, as shown in FIG. 4, copper is added in an amount of 1.5% by mass or less (including 0% by mass). For the hardness after tempering not to exceed HRC 41, the copper content is preferably 0.5% by mass or less.

In addition, if the Fp value, described below, exceeds 95.0 and delta-ferrite phase is formed in an amount of about 4% to 5% by volume during hot rolling, the steel tends to suffer a defect such as a scab or a crack due to decreased hot workability. In particular, if copper is added, a copper-segregated region forms during casting, and a crack tends to occur in the copper-segregated region, which has a low melting point at the interface between austenite and ferrite phases, during hot rolling. Although the addition of nickel is effective in preventing this, nickel is an expensive element. To reduce material costs, therefore, the copper content is preferably 0.3% by mass or less and, in some cases, it does not have to be added, that is, may be contained at an incidental impurity level.

Fp value: 80.0 to 96.0

Figure 2:
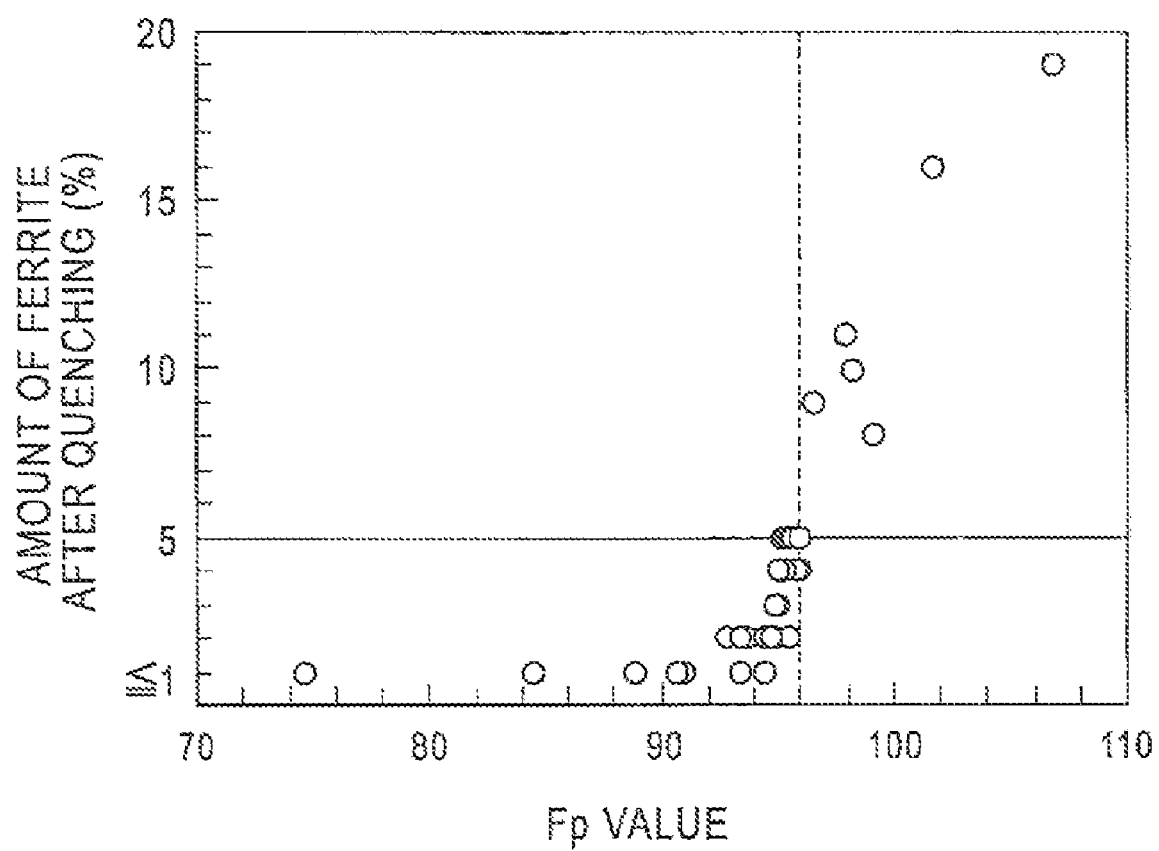
FIG. 2 is a graph showing the relationship between the Fp values and the amounts of delta-ferrite after quenching of our examples and comparative examples.
Figure 3:
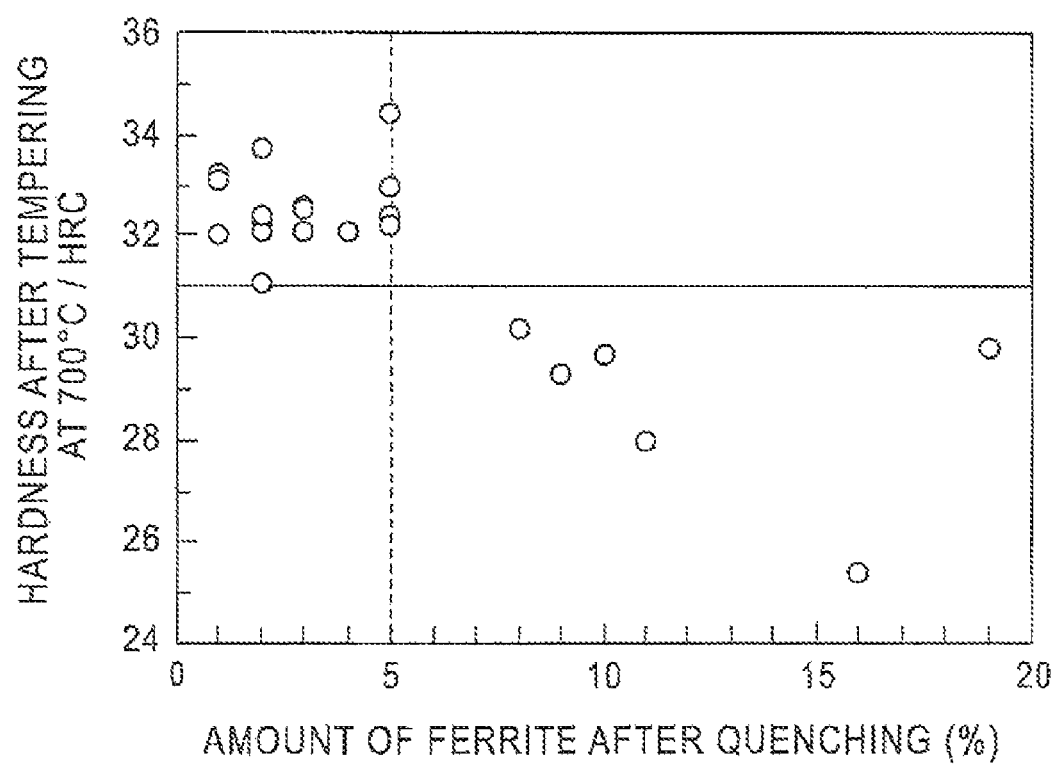
FIG. 3 is a graph showing the relationship between the amounts of delta-ferrite and the hardnesses after tempering at 700° C. of our examples and the comparative examples.

To achieve the intended heat resistance (temper softening resistance), the above ingredients must be contained not only so that the contents thereof fall within the predetermined ranges, but also so that the Fp value defined by equation (1) below satisfies 80.0 to 96.0:

$$Fp\ \text{value} = -230C + 5Si - 5Mn - 6Cu + 10Cr - 12Ni + 32Nb + 22V + 12Mo + 8W + 10Ta + 40Al - 220N \quad (1)$$

where the element symbols denote the contents of the respective elements (% by mass). This Fp value indicates the ease of formation of delta-ferrite phase during quenching, and a higher value indicates a higher ability to form delta-ferrite. FIG. 1 shows the Fp value and the hardness after tempering at 700° C., and FIG. 2 shows the Fp value and the amount of delta-ferrite after quenching. In addition, FIG. 3 shows the relationship between the amount of delta-ferrite and the hardness after tempering at 700° C. FIGS. 1, 2, and 3 are obtained by plotting examples and comparative examples with respect to composition in our Examples (Tables 1-1, 1-2, 1-3, and 1-4), as described later.

According to FIGS. 1 and 2, if the Fp value exceeds 96.0, the amount of delta-ferrite rises suddenly, and the hardness after tempering at 700° C. drops accordingly. That is, a large amount of delta-ferrite phase formed during quenching tends to promote temper softening. On the other hand, no sudden softening occurred after tempering at 500° C. to 670° C. even if the amount of delta-ferrite exceeded 5%. Thus, the amount of delta-ferrite does not have to be strictly controlled if the desired heat resistance is 670° C. or less, and is therefore not well considered in the conventional art. It has turned out that, whereas a heat resistance of 500° C. to 670° C. can be achieved even if the amount of delta-ferrite phase is several percents by volume or more, the amount of delta-ferrite phase must be strictly controlled to achieve a heat resistance of 700° C. This relationship between delta-ferrite and temper softening resistance at 700° C. is a novel finding.

As shown in FIG. 3, we found that the amount of delta-ferrite phase must be 5% by volume or less, preferably 3% or less, and more preferably 1% or less, particularly to maintain appropriate hardness after tempering at a high temperature, namely, 700° C., thus achieving unprecedented heat resistance. From this viewpoint, the Fp value must be 96.0 or less, preferably 95.0 or less. On the other hand, the Fp value is 80.0 or more because, if it falls below 80.0, it could cause decreased punching workability due to increased hardness before quenching, and excessive hardness after quenching, and also appropriate hardness cannot be achieved after tempering at 700° C. because of the formation of retained austenite phase. Accordingly, the Fp value is 80.0 to 96.0, preferably 85.0 to 95.0.

In addition to the above ingredients, the low-carbon martensitic chromium-containing steel may further contain one or more elements selected from molybdenum, tungsten, and tantalum in a total amount of 0.1% to 2.0% by mass for improved heat resistance.

Molybdenum, tungsten, and tantalum have the effect of inhibiting temper softening by dissolving in the steel or forming precipitate. In particular, these elements are effective in inhibiting temper softening in a temperature range exceeding 650° C., thus lowering the decrease in hardness after tempering at 700° C. To achieve this effect, one or more elements selected from molybdenum, tungsten, and tantalum are preferably added in a total amount of 0.1% by mass or more. On the other hand, the total content thereof is preferably 2.0% by mass or less because excessively adding these elements results in, for example, decreased manufacturability due to increased hot deformation resistance, decreased punching workability due to increased hardness before quenching, and decreased hardness after tempering at 700° C. due to formation of ferrite phase during quenching as a result of segregation in the structure. Accordingly, it is preferable to add one or more of molybdenum, tungsten, and tantalum in a total amount of 0.1% to 2.0% by mass, depending on the required level of heat resistance. More preferably, the total content thereof is 0.2% by mass or more in view of improving heat resistance and is 1.5% by mass or less in view of manufacturability, workability, and cost reduction.

In addition to the above ingredients, the low-carbon martensitic chromium-containing steel may further contain one or more elements selected from 0.0002% to 0.0030% by mass of calcium, 0.0002% to 0.0030% by mass of magnesium, and 0.0002% to 0.0060% by mass of boron for improved manufacturability and corrosion resistance.

Calcium, magnesium, and boron are effective in inhibiting the adverse effect of sulfur and phosphorus, which are harmful for hot workability, to improve manufacturability in, for example, hot rolling. To achieve this effect, calcium is preferably added in an amount of 0.0002% by mass or more, magnesium is preferably added in an amount of 0.0002% by mass or more, and boron is preferably added in an amount of 0.0002% by mass or more. On the other hand, the calcium and magnesium contents are preferably each 0.0030% by mass or less and the boron content is preferably 0.0060% by mass or less because excessively adding calcium and magnesium decreases corrosion resistance and excessively adding boron decreases castability and hot work-ability. It is therefore preferable to add, as needed, one or more elements selected from 0.0002% to 0.0030% by mass of calcium, 0.0002% to 0.0030% by mass of magnesium, and 0.0002% to 0.0060% by mass by mass of boron, more preferably, 0.0005% to 0.0030% by mass of calcium, 0.0005% to 0.0030% by mass of magnesium, and 0.0005% to 0.0060% by mass of boron.

If sulfur is contained in an amount exceeding 0.005% by mass as an incidental impurity, the calcium content is preferably limited to 0.0010% by mass or less in view of ensuring sufficient corrosion resistance.

The balance other than the above ingredients in the low-carbon martensitic chromium-containing steel includes iron and incidental impurities. Of the incidental impurities, phosphorus and sulfur are harmful elements that decrease hot workability, toughness, and corrosion resistance, and it is therefore preferable to reduce the contents thereof as much as possible. Specifically, the phosphorus content is preferably 0.05% by mass or less, and the sulfur content is preferably 0.008% by mass or less. More preferably, the phosphorus content is 0.03% by mass or less, and the sulfur content is 0.005% by mass or less.

In addition, the low-carbon martensitic chromium-containing steel may contain ingredients other than above unless they impair the desired operation and advantages. For example, the steel may contain titanium in an amount of 0.1% by mass or less, cobalt in an amount of 0.4% by mass or less, and an REM, hafnium, yttrium, zirconium, and antimony in a total amount of 0.05% by mass or less in view of improving heat resistance, corrosion resistance, and manufacturability.

Next, a method for producing the low-carbon martensitic chromium-containing steel will be described.

The method used for producing the chromium-containing steel may be one known as a method for producing a material for disc brakes, and the following method, for example, is preferred.

A steel satisfying the above ingredient composition is prepared, for example, in a steel converter or an electric furnace, and the molten steel is subjected to secondary refining by, for example, vacuum oxygen decarburization (VOD) or argon oxygen decarburization (AOD) and is then formed into slabs having a thickness of 100 to 250 mm by continuous casting or ingot casting-rolling. Continuous casting is preferred in view of productivity and uniform steel sheet quality.

The slabs thus formed are then heated to 1,000° C. to 1,300° C., are hot-rolled into hot-rolled steel sheets having a thickness of 3 to 10 mm, and are optionally subjected to annealing, descaling such as shotblasting, pickling, or grinding, and shape correction such as skin-pass rolling, thus producing materials for disc brakes. To facilitate punching for forming brake discs, the hot-rolled sheets are preferably annealed at a temperature of 650° C. to 900° C. so that the hardness is 100 or less, more preferably 95 or less, in HRB (Rockwell Hardness B-scale).

For a disc brake having a thickness of 3 mm or less, the material used is preferably a hot-rolled steel sheet hot-rolled to a thickness of 3 mm or less or a cold-rolled steel sheet produced by subjecting a hot-rolled steel sheet having a thickness of 3 mm or more to cold rolling and then optionally to, for example, annealing, descaling, and shape correction.

Next, a method for producing a brake disc will be described.

The method used for producing a brake disc may be a known method. For example, a coil or cut sheet of hot-rolled or cold-rolled steel sheet produced in the above manner is punched in a disc shape by, for example, punching, and is further punched to form, for example, grooves or small holes having the function of cooling and discharging wear dust, thus forming a desired shape. The disc is subjected to quenching by heating the disc to a temperature of 950° C. to 1,250° C. using a heat treatment furnace such as a high-frequency induction heating device or a batch-type or continuous-type heat treatment furnace and then cooling the disc at a cooling rate higher than or equal to that of air cooling, preferably followed by descaling such as pickling or surface polishing and rust-proofing treatment such as acidic treatment, for example, passivation treatment, or coating, thus producing a brake disc. The method used for quenching may be die quenching, which also serves as shape correction. In addition, stress release annealing may be optionally carried out. Although one of the major characteristics of the steel is that it can be used for brake discs after quenching alone (tempering is not needed), it may be used after tempering.

EXAMPLES

Steels having the ingredient compositions shown in Tables 1-1, 1-2, 1-3, and 1-4 were prepared as 100 kg steel ingots using a high-frequency vacuum melting furnace, and the steel ingots were hot-rolled to form hot-rolled sheets having a thickness of 4 mm under normal conditions. Subsequently, these hot-rolled sheets were subjected to heat treatment by annealing the sheets in an inert gas atmosphere at 650° C. to 850° C. for more than eight hours and then gradually cooling the sheets, thus forming annealed hot-rolled sheets. During the hot rolling, the presence or absence of cracking and rolling load during the rolling were examined, and the hot-rolled sheets were examined for the presence or absence of a defect such as a scab or a crack by visually observing the surfaces of the steel sheets. The steel sheets were evaluated as ×C (bad) in manufacturability if they had a considerable defect, were evaluated as ΔB (fair) in manufacturability if they had a minor defect and were acceptable for practical use, and were evaluated as ○A (good) in manufacturability if they had no problem.

The annealed hot-rolled sheets thus formed were subjected to the following tests.

(1) Hardenability Test

Specimens measuring thickness×30 mm×30 mm were taken from the above annealed hot-rolled sheets and were subjected to quenching by heating the sheets under various conditions shown in Table 2 and then cooling the sheets with air. After the surfaces of the quenched specimens were descaled by grinding and polishing, the surface hardness HRC thereof was measured at five spots using a Rockwell hardness meter according to JIS Z2245, and the average thereof was determined as the quenching hardness of that material. The specimens were determined to be acceptable if they had a hardness after quenching of HRC 31 to 40.

(2) Heat Resistance (Temper Softening Resistance) Test

The above quenched specimens were further subjected to tempering by heating the specimens at three levels, namely, at 500° C. for one hour, at 650° C. for one hour, and at 700° C. for one hour, and then cooling the specimens with air. After the surfaces of the specimens were descaled by grinding, they were evaluated for heat resistance by measuring the surface hardness HRC thereof at five spots using a Rockwell hardness meter according to JIS Z2245 and determining the average thereof. The specimens were determined to be acceptable if they had a hardness after tempering 700° C. for one hour of HRC 31 or more.

(3) Corrosion Resistance Test

Specimens measuring thickness×70 mm×150 mm were taken from the above annealed hot-rolled sheets, were subjected to wet polishing using a No. 320 emery paper, and were subjected to a salt spray test (SST) according to JIS Z2371. The SST was continued for 48 hours, and the number of rusty spots was counted by visually observing the surfaces of the specimens after the test. The specimens were determined to be ○A (good) if they had no rusty spot, were determined to be ΔB (fair) if they had one to four rusty spots, and were determined to be ×C (bad) if they had five or more rusty spots, where ○A and ΔB are acceptable.

(4) Measurement of Amount of Delta-Ferrite

For measurement of the amount of delta-ferrite, cross-sections of the quenched specimens were polished, were etched with a Murakami test reagent, and were examined for microstructure using an optical microscope. For each specimen, optical micrographs were taken in five fields of view at a magnification of 400 times, the amount of delta-ferrite phase was measured by image analysis, and the average thereof was determined.

The results of the above tests are shown together in Tables 2-1 and 2-2. According to Tables 2-1 and 2-2, Steel Nos. 1 to 12, Steel Nos. 23 to 26, and Steel Nos. 30 to 34, which had our ingredient compositions, had a hardness after quenching of HRC 31 to 40 and a hardness after tempering at 700° C. of HRC 31 or more, thus having superior temper softening resistance, and were also superior in corrosion resistance and manufacturability.

In contrast, the steel sheets of Steel Nos. 13 to 22, Steel Nos. 27 to 29, and Steel Nos. 35 to 40, which did not satisfy our ingredient compositions, did not have a hardness after quenching of HRC 31 to 40 or, if they had a hardness after quenching of HRC 31 to 40, had a hardness after tempering at 700° C. of less than HRC 31 or did not achieve the intended manufacturability or corrosion resistance.

Steel No. 16, where the total content of niobium and vanadium was excessive, was determined to be ΔB in manufacturability because a defect resulted from decreased hot workability. In addition, Steel No. 25, where the sulfur content was not less than 0.005% by mass and the calcium content exceeded 0.0010% by mass, was determined to be ΔB in rusting resistance because it had inferior corrosion resistance.

In addition, Steel Nos. 35 to 38 are examples of steels we previously made in which the hardness after tempering at 600° C. for two hours is HRC 32 or more (Steel Nos. F, G, L, and X in Table 1 of Japanese Unexamined Patent Application Publication No. 2005-307346). Steel No. 35, where the Fp value was within the scope of this disclosure but the vanadium content was beyond the scope of this disclosure, could not achieve a hardness after tempering at 700° C. of HRC 31 or more. In addition, (Steel Nos.) 36 to 38, where the Fp value exceeded our upper limit, could not achieve a hardness after tempering at 700° C. of HRC 31 or more because the amount of delta-ferrite after quenching was not less than 9% by volume.

TABLE 1-1

| Steel No. | Chemical composition (% by mass, except that Ca, Mg, and B are expressed in ppm by mass) | | | | | | | | | | | | |
|---|---|---|---|---|---|---|---|---|---|---|---|---|---|
| | C | Si | Mn | P | S | Cr | Ni | Cu | Al | Nb | V | Mo | Ta |
| 1 | 0.048 | 0.30 | 1.55 | 0.03 | 0.002 | 12.2 | 0.67 | — | 0.002 | 0.23 | 0.20 | — | — |
| 2 | 0.029 | 0.17 | 1.68 | 0.02 | 0.003 | 11.9 | 0.24 | 0.49 | 0.001 | 0.16 | 0.33 | — | — |
| 3 | 0.060 | 0.07 | 1.04 | 0.03 | 0.003 | 13.1 | 1.64 | — | 0.002 | 0.19 | 0.41 | — | — |
| 4 | 0.067 | 0.13 | 1.71 | 0.01 | 0.004 | 11.7 | 0.50 | 0.94 | 0.005 | 0.21 | 0.15 | 1.16 | — |
| 5 | 0.049 | 0.33 | 1.50 | 0.03 | 0.001 | 12.0 | 1.25 | — | 0.001 | 0.12 | 0.61 | — | — |
| 6 | 0.070 | 0.14 | 1.87 | 0.03 | 0.003 | 12.2 | 0.49 | — | 0.011 | 0.20 | 0.18 | — | 0.78 |
| 7 | 0.055 | 0.25 | 1.12 | 0.01 | 0.005 | 10.9 | 0.08 | 0.30 | 0.018 | 0.24 | 0.20 | — | — |
| 8 | 0.045 | 0.14 | 0.50 | 0.03 | 0.002 | 11.5 | 0.85 | — | 0.001 | 0.17 | 0.28 | — | — |
| 9 | 0.057 | 0.10 | 1.65 | 0.02 | 0.003 | 12.6 | 0.98 | — | 0.010 | 0.19 | 0.20 | 0.51 | — |

TABLE 1-1-continued

| | | | | | | | | | | | | |
|---|---|---|---|---|---|---|---|---|---|---|---|---|
| 10 | 0.050 | 0.20 | 1.99 | 0.03 | 0.002 | 11.2 | 0.33 | 0.48 | 0.003 | 0.40 | 0.25 | 0.30 | — |

| Steel | Chemical composition (% by mass, except that Ca, Mg, and B are expressed in ppm by mass) | | | | | | | | |
|---|---|---|---|---|---|---|---|---|---|
| N° | W | N | Ca | Mg | B | C + N | Nb + V | Mo + Ta + W | Fp*[1] | Remarks |
| 1 | — | 0.057 | — | — | — | 0.11 | 0.43 | — | 96.0 | Invention example |
| 2 | — | 0.075 | — | — | — | 0.10 | 0.49 | — | 94.9 | Invention example |
| 3 | — | 0.054 | — | — | — | 0.11 | 0.60 | — | 96.0 | Invention example |
| 4 | — | 0.079 | — | — | — | 0.15 | 0.36 | 1.16 | 88.8 | Invention example |
| 5 | 0.50 | 0.062 | — | — | — | 0.11 | 0.73 | 0.50 | 95.5 | Invention example |
| 6 | — | 0.068 | — | — | — | 0.14 | 0.38 | 0.78 | 95.0 | Invention example |
| 7 | — | 0.080 | — | — | — | 0.14 | 0.44 | — | 84.4 | Invention example |
| 8 | — | 0.052 | — | — | — | 0.10 | 0.45 | — | 92.9 | Invention example |
| 9 | — | 0.066 | — | — | — | 0.12 | 0.39 | 0.51 | 95.9 | Invention example |
| 10 | — | 0.059 | — | — | — | 0.11 | 0.65 | 0.30 | 93.8 | Invention example |

*[1] Fp value = −230C + 5Si − 5Mn − 6Cu + 10Cr − 12Ni + 32Mb + 22V + 12Mo + 8W + 10Ta + 40Al − 220N

TABLE 1-2

| Steel | Chemical composition (% by mass, except that Ca, Mg, and B are expressed in ppm by mass) | | | | | | | | | | | | |
|---|---|---|---|---|---|---|---|---|---|---|---|---|---|
| N° | C | Si | Mn | P | S | Cr | Ni | Cu | Al | Nb | V | Mo | Ta |
| 11 | 0.072 | 0.12 | 1.32 | 0.03 | 0.002 | 12.1 | 0.40 | — | 0.002 | 0.20 | 0.50 | — | — |
| 12 | 0.092 | 0.38 | 0.44 | 0.01 | 0.001 | 12.2 | 1.30 | 1.46 | 0.007 | 0.50 | 0.15 | 0.50 | 0.10 |
| 13 | 0.060 | 0.22 | 1.04 | 0.03 | 0.003 | 12.0 | 0.51 | — | 0.003 | 0.03 | 0.30 | — | — |
| 14 | 0.042 | 0.25 | 1.61 | 0.01 | 0.005 | 12.1 | 0.11 | — | 0.003 | 0.24 | 0.26 | — | — |
| 15 | 0.073 | 0.28 | 1.54 | 0.03 | 0.005 | 12.4 | 0.65 | 0.42 | 0.001 | 0.34 | 0.08 | — | — |
| 16 | 0.079 | 0.35 | 0.90 | 0.03 | 0.005 | 11.8 | 1.50 | — | 0.001 | 0.25 | 0.84 | — | — |
| 17 | 0.098 | 0.10 | 1.30 | 0.02 | 0.001 | 12.3 | 1.00 | — | 0.014 | 0.20 | 0.14 | — | — |
| 18 | 0.012 | 0.22 | 0.75 | 0.01 | 0.005 | 10.6 | 0.69 | 1.50 | 0.001 | 0.33 | 0.42 | — | 0.09 |
| 19 | 0.064 | 0.09 | 1.05 | 0.04 | 0.005 | 12.1 | 0.65 | 2.21 | 0.002 | 0.32 | 0.30 | 0.48 | — |
| 20 | 0.112 | 0.40 | 1.90 | 0.05 | 0.006 | 10.7 | 0.14 | — | 0.005 | 0.24 | 0.45 | 0.40 | — |

| Steel | Chemical composition (% by mass, except that Ca, Mg, and B are expressed in ppm by mass) | | | | | | | | | |
|---|---|---|---|---|---|---|---|---|---|---|
| N° | W | N | Ca | Mg | B | C + N | Nb + V | Mo + Ta + W | Fp*[1] | Remarks |
| 11 | — | 0.072 | — | — | — | 0.14 | 0.70 | — | 95.3 | Invention example |
| 12 | 0.21 | 0.061 | — | — | — | 0.15 | 0.65 | 0.81 | 91.0 | Invention example |
| 13 | 0.10 | 0.039 | — | — | — | 0.10 | 0.33 | 0.10 | 95.9 | Comparative example |
| 14 | — | 0.045 | — | — | — | 0.09 | 0.50 | — | 106.8 | Comparative example |
| 15 | — | 0.034 | — | — | — | 0.11 | 0.42 | — | 95.8 | Comparative example |
| 16 | — | 0.045 | — | — | — | 0.12 | 1.09 | — | 95.7 | Comparative example |
| 17 | 0.50 | 0.014 | — | — | — | 0.11 | 0.34 | 0.50 | 93.4 | Comparative example |
| 18 | 0.35 | 0.061 | — | — | — | 0.07 | 0.75 | 0.44 | 93.4 | Comparative example |
| 19 | — | 0.035 | — | — | — | 0.10 | 0.62 | 0.48 | 95.4 | Comparative example |
| 20 | — | 0.018 | — | — | — | 0.13 | 0.69 | 0.40 | 90.7 | Comparative example |

*[1] Fp value = −230C + 5Si − 5Mn − 6Cu + 10Cr − 12Ni + 32Mb + 22V + 12Mo + 8W + 10Ta + 40Al − 220N

TABLE 1-3

| Steel N° | Chemical composition (% by mass, except that Ca, Mg, and B are expressed in ppm by mass) | | | | | | | | | | | | |
|---|---|---|---|---|---|---|---|---|---|---|---|---|---|
| | C | Si | Mn | P | S | Cr | Ni | Cu | Al | Nb | V | Mo | Ta |
| 21 | 0.084 | 0.08 | 2.26 | 0.02 | 0.004 | 12.0 | 1.98 | — | 0.021 | 0.28 | 0.18 | 0.52 | 0.50 |
| 22 | 0.090 | 0.26 | 0.94 | 0.01 | 0.002 | 12.5 | 2.24 | — | 0.018 | 0.30 | 0.26 | — | — |
| 23 | 0.073 | 0.10 | 0.97 | 0.05 | 0.007 | 11.9 | 0.30 | 0.11 | 0.003 | 0.28 | 0.20 | — | — |
| 24 | 0.070 | 0.18 | 1.20 | 0.05 | 0.006 | 12.2 | 0.38 | 0.35 | 0.001 | 0.30 | 0.17 | 0.18 | — |
| 25 | 0.062 | 0.20 | 1.61 | 0.05 | 0.005 | 11.8 | 0.25 | 0.34 | 0.004 | 0.18 | 0.39 | — | 0.22 |
| 26 | 0.065 | 0.17 | 1.55 | 0.05 | 0.004 | 12.1 | 0.91 | — | 0.002 | 0.21 | 0.30 | 0.50 | — |
| 27 | 0.085 | 0.25 | 1.70 | 0.05 | 0.007 | 12.2 | 0.40 | — | 0.001 | 0.30 | 0.16 | — | 0.47 |
| 28 | 0.064 | 0.28 | 0.55 | 0.01 | 0.009 | 10.6 | 0.62 | 0.83 | 0.026 | 0.55 | 0.16 | — | — |
| 29 | 0.072 | 0.15 | 1.32 | 0.04 | 0.006 | 12.3 | 0.75 | — | 0.001 | 0.34 | 0.36 | — | — |
| 30 | 0.068 | 0.15 | 1.92 | 0.03 | 0.002 | 12.5 | 0.88 | — | 0.020 | 0.15 | 0.25 | — | — |

| Steel N° | Chemical composition (% by mass, except that Ca, Mg, and B are expressed in ppm by mass) | | | | | | | | |
|---|---|---|---|---|---|---|---|---|---|
| | W | N | Ca | Mg | B | C + N | Nb + V | Mo + Ta + W | Fp*1) | Remarks |
| 21 | 1.10 | 0.023 | — | — | — | 0.11 | 0.46 | 2.12 | 94.8 | Comparative example |
| 22 | — | 0.070 | — | — | — | 0.16 | 0.56 | — | 74.7 | Comparative example |
| 23 | — | 0.053 | — | — | — | 0.13 | 0.48 | — | 95.4 | Invention example |
| 24 | — | 0.067 | — | — | 32 | 0.14 | 0.47 | 0.18 | 94.9 | Invention example |
| 25 | 0.25 | 0.070 | 14 | 8 | — | 0.13 | 0.57 | 0.47 | 95.0 | Invention example |
| 26 | — | 0.055 | — | 10 | 18 | 0.12 | 0.51 | 0.50 | 95.5 | Invention example |
| 27 | — | 0.056 | 35 | 6 | 15 | 0.14 | 0.46 | 0.47 | 95.9 | Comparative example |
| 28 | 0.61 | 0.046 | 10 | 31 | — | 0.11 | 0.71 | 0.61 | 94.4 | Comparative example |
| 29 | — | 0.066 | — | 8 | 85 | 0.14 | 0.70 | — | 95.9 | Comparative example |
| 30 | — | 0.030 | — | — | — | 0.10 | 0.40 | — | 94.5 | Invention example |

*1)Fp value = −230C + 5Si − 5Mn − 6Cu + 10Cr − 12Ni + 32Mb + 22V + 12Mo + 8W + 10Ta + 40Al − 220N

TABLE 1-4

| Steel N° | Chemical composition (% by mass, except that Ca, Mg, and B are expressed in ppm by mass) | | | | | | | | | | | | |
|---|---|---|---|---|---|---|---|---|---|---|---|---|---|
| | C | Si | Mn | P | S | Cr | Ni | Cu | Al | Nb | V | Mo | Ta |
| 31 | 0.075 | 0.09 | 1.58 | 0.03 | 0.002 | 11.8 | 0.03 | 0.14 | 0.002 | 0.29 | 0.16 | 0.20 | — |
| 32 | 0.076 | 0.12 | 1.52 | 0.03 | 0.002 | 11.9 | 0.20 | 0.14 | 0.006 | 0.32 | 0.17 | 0.21 | — |
| 33 | 0.069 | 0.28 | 1.60 | 0.02 | 0.002 | 11.8 | 0.03 | 0.46 | 0.005 | 0.32 | 0.17 | 0.21 | — |
| 34 | 0.065 | 0.26 | 1.62 | 0.03 | 0.003 | 11.9 | 0.14 | 0.45 | 0.003 | 0.30 | 0.17 | 0.19 | — |
| 35 | 0.022 | 0.30 | 1.58 | 0.02 | 0.003 | 12.7 | 0.58 | 0.44 | 0.003 | 0.18 | 0.08 | — | — |
| 36 | 0.042 | 0.24 | 1.55 | 0.02 | 0.002 | 12.7 | 0.17 | — | 0.003 | 0.09 | 0.15 | — | — |
| 37 | 0.020 | 0.13 | 1.82 | 0.02 | 0.002 | 12.6 | 0.23 | 0.33 | 0.002 | 0.09 | 0.28 | — | — |
| 38 | 0.020 | 0.22 | 1.61 | 0.02 | 0.003 | 12.5 | 0.31 | — | 0.003 | 0.12 | 0.28 | — | — |
| 39 | 0.072 | 0.11 | 0.66 | 0.03 | 0.005 | 11.8 | 0.73 | — | 0.002 | 0.27 | 0.16 | 0.30 | — |
| 40 | 0.049 | 0.33 | 1.03 | 0.03 | 0.005 | 12.1 | 0.50 | 0.77 | 0.043 | 0.15 | 0.35 | — | — |

| Steel N° | Chemical composition (% by mass, except that Ca, Mg, and B are expressed in ppm by mass) | | | | | | | | |
|---|---|---|---|---|---|---|---|---|---|
| | W | N | Ca | Mg | B | C + N | Nb + V | Mo + Ta + W | Fp*1 | Remarks |
| 31 | — | 0.053 | — | — | — | 0.13 | 0.45 | 0.20 | 95.7 | Invention example |
| 32 | — | 0.056 | — | — | — | 0.13 | 0.49 | 0.21 | 95.7 | Invention example |
| 33 | — | 0.063 | — | — | — | 0.13 | 0.49 | 0.21 | 95.3 | Invention example |
| 34 | — | 0.060 | — | — | — | 0.13 | 0.46 | 0.19 | 95.2 | Invention example |
| 35 | — | 0.083 | — | — | — | 0.11 | 0.26 | — | 95.1 | Comparative example*2 |
| 36 | — | 0.058 | — | — | — | 0.10 | 0.24 | — | 101.8 | Comparative example*2 |
| 37 | — | 0.095 | — | — | — | 0.12 | 0.37 | — | 96.5 | Comparative example*2 |

TABLE 1-4-continued

| 38 | — | 0.100 | — | — | — | 0.12 | 0.40 | — | 98.1 | Comparative example*[2] |
| 39 | — | 0.034 | — | — | — | 0.11 | 0.43 | 0.30 | 98.3 | Comparative example |
| 40 | — | 0.049 | — | — | — | 0.10 | 0.50 | — | 99.1 | Comparative example |

*[1]Fp value = −230C + 5Si − 5Mn − 6Cu + 10Cr − 12Ni + 32Nb + 22V + 12Mo + 8W + 10Ta + 40Al − 220N

*[2]Steel Nos. 35-38 correspond to Steel Nos. F, G, L, and X in Tables 1-1 and 1-2 of Japanese Unexamined Patent Application Publication No. 2005-307346.

TABLE 2-1

| Steel N° | Quenching conditions | Amount of ferrite after quenching (%) | Hardness (HRC) After quenching | After tempering 500° C. | After tempering 650° C. | After tempering 700° C. | Manufacturability | Rusting resistance | Remarks |
|---|---|---|---|---|---|---|---|---|---|
| 1 | 1190° C. × 1 min | 5 | 35.5 | 37.7 | 33.4 | 32.4 | ○A | ○A | Invention example |
| 2 | 1160° C. × 10 min | 2 | 35.1 | 38.2 | 33.9 | 32.3 | ○A | ○A | Invention example |
| 3 | 1230° C. × 5 min | 4 | 38.5 | 39.9 | 33.5 | 32.1 | ○A | ○A | Invention example |
| 4 | 1030° C. × 10 min | ≦1 | 36.7 | 41.0 | 35.6 | 33.2 | ○A | ○A | Invention example |
| 5 | 1200° C. × 1 min | 2 | 37.2 | 38.3 | 33.6 | 32.1 | ○A | ○A | Invention example |
| 6 | 1090° C. × 10 min | 3 | 38.4 | 40.4 | 34.3 | 32.6 | ○A | ○A | Invention example |
| 7 | 1180° C. × 10 min | ≦1 | 36.8 | 39.8 | 34.5 | 32.0 | ○A | ΔB | Invention example |
| 8 | 1210° C. × 10 min | 2 | 34.9 | 37.5 | 33.8 | 32.4 | ○A | ○A | Invention example |
| 9 | 1150° C. × 15 min | 5 | 37.7 | 39.0 | 36.1 | 34.4 | ○A | ○A | Invention example |
| 10 | 1200° C. × 1 min | 2 | 36.0 | 40.4 | 35.4 | 33.7 | ○A | ○A | Invention example |
| 11 | 1120° C. × 10 min | 5 | 36.9 | 38.7 | 34.5 | 32.2 | ○A | ○A | Invention example |
| 12 | 990° C. × 10 min | ≦1 | 39.2 | 41.7 | 35.8 | 33.1 | ○A | ○A | Invention example |
| 13 | 1200° C. × 10 min | 5 | 35.4 | 37.6 | 32.0 | 28.2 | ○A | ○A | Comparative example |
| 14 | 1150° C. × 10 min | 19 | 34.9 | 37.3 | 31.9 | 29.8 | ○A | ○A | Comparative example |
| 15 | 1200° C. × 1 min | 4 | 37.1 | 40.4 | 33.3 | 28.5 | ○A | ○A | Comparative example |
| 16 | 1150° C. × 10 min | 5 | 36.0 | 38.0 | 33.0 | 29.3 | ΔB | ○A | Comparative example |
| 17 | 1240° C. × 1 min | ≦1 | 38.5 | 40.6 | 32.9 | 27.6 | ○A | ΔB | Comparative example |
| 18 | 1070° C. × 10 min | 2 | 34.0 | 41.5 | 34.8 | 29.0 | ○A | ΔB | Comparative example |
| 19 | 1000° C. × 2 min | 4 | 34.7 | 43.1 | 34.7 | 32.2 | XC | ○A | Comparative example |
| 20 | 1020° C. × 10 min | ≦1 | 36.6 | 39.2 | 30.5 | 27.5 | ΔB | XC | Comparative example |

TABLE 2-2

| Steel N° | Quenching conditions | Amount of ferrite after quenching (%) | Hardness (HRC) After quenching | After tempering 500° C. | After tempering 650° C. | After tempering 700° C. | Manufacturability | Rusting resistance | Remarks |
|---|---|---|---|---|---|---|---|---|---|
| 21 | 980° C. × 10 min | 2 | 39.7 | 42.0 | 35.5 | 29.5 | XC | ○A | Comparative example |
| 22 | 1000° C. × 10 min | ≦1 | 40.8 | 42.5 | 33.2 | 30.2 | ○A | ○A | Comparative example |
| 23 | 1200° C. × 1 min | 5 | 36.2 | 38.0 | 33.6 | 32.2 | ΔB | ΔB | Invention example |
| 24 | 1140° C. × 10 min | 3 | 36.6 | 39.4 | 33.8 | 32.5 | ○A | ○A | Invention example |

TABLE 2-2-continued

| Steel N° | Quenching conditions | Amount of ferrite after quenching (%) | Hardness (HRC) After quenching | After tempering 500° C. | After tempering 650° C. | After tempering 700° C. | Manufacturability | Rusting resistance | Remarks |
|---|---|---|---|---|---|---|---|---|---|
| 25 | 1150° C. × 10 min | 3 | 35.9 | 39.5 | 33.4 | 32.1 | ○A | ΔB | Invention example |
| 26 | 1210° C. × 10 min | 5 | 37.2 | 39.3 | 34.1 | 33.0 | ○A | ○A | Invention example |
| 27 | 1200° C. × 1 min | 5 | 36.8 | 40.2 | 33.5 | 32.2 | ○A | XC | Comparative example |
| 28 | 990° C. × 15 min | ≦1 | 37.2 | 41.4 | 34.5 | 33.1 | ΔB | XC | Comparative example |
| 29 | 1100° C. × 10 min | 5 | 37.2 | 39.7 | 33.8 | 32.8 | XC | ○A | Comparative example |
| 30 | 1240° C. × 0.2 min | 2 | 36.2 | 37.9 | 32.9 | 31.1 | ○A | ○A | Invention example |
| 31 | 1190° C. × 10 min | 5 | 37.5 | 38.5 | 33.4 | 32.0 | ΔB | ○A | Invention example |
| 32 | 1190° C. × 10 min | 5 | 37.1 | 39.0 | 33.6 | 32.2 | ○A | ○A | Invention example |
| 33 | 1200° C. × 0.2 min | 4 | 36.8 | 39.6 | 33.8 | 32.3 | ΔB | ○A | Invention example |
| 34 | 1200° C. × 0.2 min | 3 | 36.6 | 39.6 | 34.0 | 32.4 | ○A | ○A | Invention example |
| 35 | 1180° C. × 1 min | 4 | 35.1 | 38.0 | 31.3 | 27.3 | ○A | ○A | Comparative example*2 |
| 36 | 1120° C. × 10 min | 16 | 36.1 | 36.5 | 27.8 | 25.4 | ○A | ○A | Comparative example*2 |
| 37 | 1200° C. × 0.5 min | 9 | 37.0 | 37.6 | 33.3 | 29.3 | ○A | ○A | Comparative example*2 |
| 38 | 1230° C. × 1 min | 11 | 36.8 | 38.5 | 30.6 | 28.0 | ○A | ○A | Comparative example*2 |
| 39 | 1180° C. × 0.5 min | 10 | 37.4 | 39.5 | 31.4 | 29.7 | ○A | ○A | Comparative example |
| 40 | 1180° C. × 0.5 min | 8 | 36.5 | 41.2 | 31.4 | 30.2 | ○A | ○A | Comparative example |

*2: Steel Nos. 35-38 correspond to Steel Nos. F, G, L, and X in Tables 1-1 and 1-2 of Japanese Unexamined Patent Application Publication No. 2005-307346.

The invention claimed is:

1. A low-carbon martensitic chromium-containing steel comprising:
   0.02% to 0.10% by mass of carbon and 0.02% to 0.10% by mass of nitrogen, the total content of carbon and nitrogen being 0.08% to 0.16% by mass;
   0.5% by mass or less of silicon;
   0.1% by mass or less of aluminum;
   0.3% to 3.0% by mass of manganese;
   10.5% to 13.5% by mass of chromium;
   0.05% to 0.60% by mass of niobium and 0.15% to 0.80% by mass of vanadium, the total content of niobium and vanadium being 0.25% to 0.95% by mass;
   0.02% to 2.0% by mass of nickel; and
   less than 0.5% by mass of copper;
   the balance comprising iron and incidental impurities; the steel having an Fp value of 80.0 to 96.0, a hardness after quenching of HRC 31 to 40, and a hardness after tempering at 700° C. for one hour of HRC 31 or more, the Fp value represented by equation (1):

$$Fp \text{ value} = -230C + 5Si - 5Mn - 6Cu + 10Cr - 12Ni + 32Nb + 22V + 12Mo + 8W + 10Ta + 40Al - 220N \quad (1)$$

wherein the element symbols denote the contents of the respective elements (% by mass).

2. The low-carbon martensitic chromium-containing steel according to claim 1, further comprising one or more elements selected from the group consisting of molybdenum, tungsten, and tantalum in a total amount of 0.1% to 2.0% by mass in addition to the above ingredient composition.

3. The low-carbon martensitic chromium-containing steel according to claim 1, further comprising one or more elements selected from the group consisting of 0.0002% to 0.0030% by mass of calcium, 0.0002% to 0.0030% by mass of magnesium, and 0.0002% to 0.0060% by mass of boron.

4. The low-carbon martensitic chromium-containing steel according to claim 1, wherein the steel has a structure containing 5% by volume or less of delta-ferrite phase after quenching.

5. A brake disc comprising a low-carbon martensitic chromium-containing steel according to claim 1.

6. The low-carbon martensitic chromium-containing steel according to claim 2, further comprising one or more elements selected from the group consisting of 0.0002% to 0.0030% by mass of calcium, 0.0002% to 0.0030% by mass of magnesium, and 0.0002% to 0.0060% by mass of boron.

7. The low-carbon martensitic chromium-containing steel according to claim 2, wherein the steel has a structure containing 5% by volume or less of delta-ferrite phase after quenching.

8. The low-carbon martensitic chromium-containing steel according to claim 3, wherein the steel has a structure containing 5% by volume or less of delta-ferrite phase after quenching.

9. A brake disc comprising a low-carbon martensitic chromium-containing steel according to claim 2.

10. A brake disc comprising a low-carbon martensitic chromium-containing steel according to claim 3.

* * * * *